United States Patent [19]

Young

[11] Patent Number: 4,679,123
[45] Date of Patent: Jul. 7, 1987

[54] CABLE ORGANIZING AND PROTECTION SYSTEM AND METHOD

[75] Inventor: William K. Young, Norwalk, Conn.

[73] Assignee: T-Bar Incorporated, Wilton, Conn.

[21] Appl. No.: 838,178

[22] Filed: Mar. 10, 1986

[51] Int. Cl.[4] .............................................. H02B 1/20
[52] U.S. Cl. .................................. 361/428; 361/390; 174/72 A
[58] Field of Search ............... 361/390, 427, 428, 429, 361/334; 174/72 A, 72 R; 179/98

[56] References Cited

U.S. PATENT DOCUMENTS 2,933,656  4/1960  Ruth ..................................... 361/334
3,148,311  9/1964  Conway et al. ...................... 361/429

Primary Examiner—Roy N. Envall, Jr.
Attorney, Agent, or Firm—Dann, Dorfman, Herrell and Skillman

[57] ABSTRACT

Multiple conductor cables are connected to horizontally distributed component equipments within a vertical array inside a cabinet. The cables are brought into the cabinet through or near the bottom and a clear space is provided within the cabinet generally parallel to the arrays. Each array has a plurality of cables, each consisting of a plurality of conductors. Starting with the lowermost, the cables to connect to a given equipment are collected into a bundle by retainer means, preferably a resilient U-shaped clip which can be sprung to fit into a hole in a plate along a cabinet wall. The cables are terminated in connector means which are plugged into horizontally distributed mating connectors for each component equipment supported on a stress relief panel supported by the cabinet. The clip for each bundle of cables is generally at the level of the component equipment to which it attaches so that it carries most of the weight of the cables. The lowermost component equipment is connected first and its retainer is supported on the cabinet closest to the array. Later component equipments are connected in sequence from the lowermost to the uppermost and their cable retainers are supported on the cabinet in a pattern progressively further from the strain relief panel but always close to the level of the component equipment to which they connect.

12 Claims, 5 Drawing Figures

CABLE ORGANIZING AND PROTECTION SYSTEM AND METHOD

The present invention relates to a means whereby cables connected to electronic equipment supported on a frame or in a cabinet are supported in that frame and attached to that equipment so as to be relatively free of strain and are organized so that one seeking to locate specific cables, or conductors in those cables, can more easily find them for maintenance or repair purposes. It also relates to a method of installing and a method of removing cables for repair. The Nature of the Prior Art In the prior art, particularly in data switching equipment, little or no organization of cables has been undertaken. At best cables, and at worst individual conductors, have been brought into a cabinet wherein connection is made to equipment and connection has been made directly to a switch terminal or a printed circuit board. In times past when systems were relatively less complex, such an arrangement could be tolerated because the number of conductors involved was relatively small compared to the huge numbers involved in today's equipment. This increase in wiring, which has been recognized as a problem for many years, has resulted in considerable loss of time when repairs and maintenance have to be made. However, no practical system for organizing the cabling has been proposed until the present invention.

To put the prior art in perspective, the nature of cables or connectors used in equipment in the prior art was simply finding the right connection for the cable, dressing it over a rod and relying on the connector hardware attached to printed circuit assemblies to retain the cable. Compounding the problem, typically printed circuit board connectors supported the weight of the cable. Any movement of the cable during routine operation or maintenance was likely to cause a separation of the connectors and, in some cases, physical damage. As systems have become more complex and number of conductors have increased, the likelihood of damage has increased and the difficulty of locating and correcting damage has increased.

THE NATURE OF THE PRESENT INVENTION

The present invention solves the above problems in a simple manner at low cost. The present invention forces field installation personnel to conform to a neat orderly cable arrangement making the maintenance convenience and reconfiguration relatively simple. The present invention should avoid much of the damage common in the prior art to equipment.

The present invention was conceived not only as a means of organizing and protecting cables but, in particular, to relieve the strain imposed by conductors, particularly those connected to printed circuit boards. The present invention relieves the strain on equipment, particularly printed circuit boards caused by their direct connection to heavy masses of wiring commonly combined in relatively massive cables. The present invention avoids concentrating the combined weight of conductors in a cable on a few connections with undesirable results.

The present invention also provides an organized system which allows installation and relocation of data communication cables in the field without the use of lose hardware which could cause damage or other problems in the system or simply result in complication.

The system, as conceived, allows neat and orderly installation of cables. The system provides for maximum accessability when fully installed and, at the same time, provides strain relief for connectors. The system as preferred can be installed with simple hand tools and has no lose hardware to become lost or not replaced during reconfiguration. This system also permits the use of electrical connectors to aid in EMI/RFI protection and signal transmission protection.

The present invention is based upon the use of cable bundle retainers which are supported on the frame and are placed relative to one another to support the cables in convenient groups accessible to the equipment to which they connect. In order to put the retainers in such positions, it is desirable to have means on the frame or housing to support the retainers relative to one another in the predetermined positions. It is also desirable to add between the cable and the equipment a strain relief plate that accepts threaded attachment screws on the connector housing.

Stated another way, the system is implemented by three major components. First, there is what is preferably a U-shaped spring steel cable bundle retainer that can hold on the order of eight cables and is designed the hold the cables close to their point of attachment to a equipment at a particular level. The holder can be modified as to size or can be subject to add ons to accommodate additional cables or to accommodate cables of different sizes.

Second, there is a support frame portion, often a containing cabinet, typically including a plate which supports the cable bundle retainers in predetermined positions relative to one another and the equipment so as to enable the orderly cable routing and strain relief. With the spring steel cable holders, this frame portion is ideally a plate with appropriate openings to be engaged by and interlocked with the cable bundle retainers to position the cable bundle retainers in proper relative positions. These positions used in connection with a vertical run of cables to component equipments at different horizontal levels effectively position the openings further away horizontally from the equipment the higher the equipment level, so that the cable bundle for the highest equipment will be closest to the back of the cabinet and normally last to assemble.

Third, a strain relief panel accepts connections, such as threaded attachment screws, supporting a connector on the end of a cable. The panel is, in turn, affixed to the frame and transfers forces on the cables to the surrounding framework. The strain relief panel covers and protects printed circuit board pins or other connectors from the stresses which would otherwise be associated with direct connection of the equipment terminals to unsupported cables or individual conductors. The strain relief panel is preferably a conductor and, therefore, also provides a frame ground to terminate cable shields when required.

In accordance with the present invention, a cable organizing and protecting system is provided for use in high conductor density equipment. The system employs a frame for supporting equipment in a multi-level array wherein each equipment component is organized in a generally linear configuration within the array and a plurality of cables are connected into each component equipment. The frame provides entrance for cables and a clear path generally parallel to the array. At least one cable bundle retainer is provided for each component equipment supported on the frame, generally at the level of each component equipment to which the cable bundle is to be connected. The position of the retainer is determined by the equipment component to which it is attached. The bundle retainers are individually supported, arranged in a stepped array progressively outward from the component equipment, such that the retainer most remote from the cable entrance is further from the component equipment to which its supported cables are to be connected.

In preferred embodiments, a strain relief panel is provided to which cable terminal connectors are affixed, and the strain relief panels are, in turn, affixed to the frame. Individual conductors may be connected to connector means in the terminal connectors mating with connector means, or the conductors may be individually attached, stress free to appropriate equipment terminals.

The invention is also related to a method of assembling cables into equipment of the type described and a method of partial assembly for repair or maintenance.

For a better understanding of the present invention, reference is made to the accompanying drawings in which.

Figure 3:
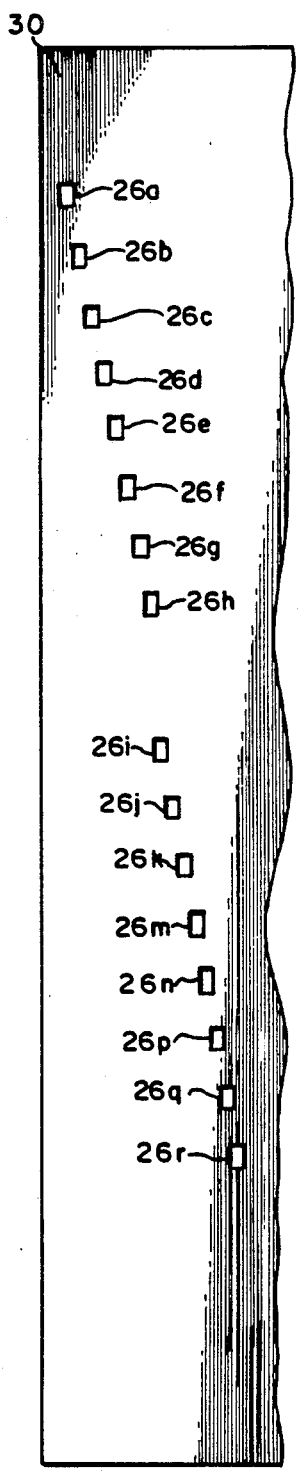
Figure 4:
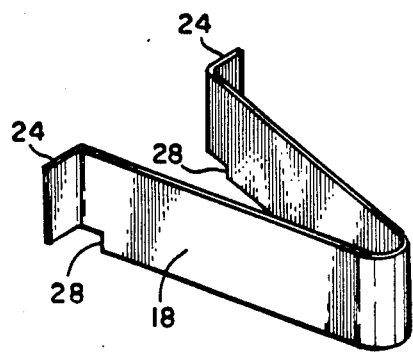
Figure 5:
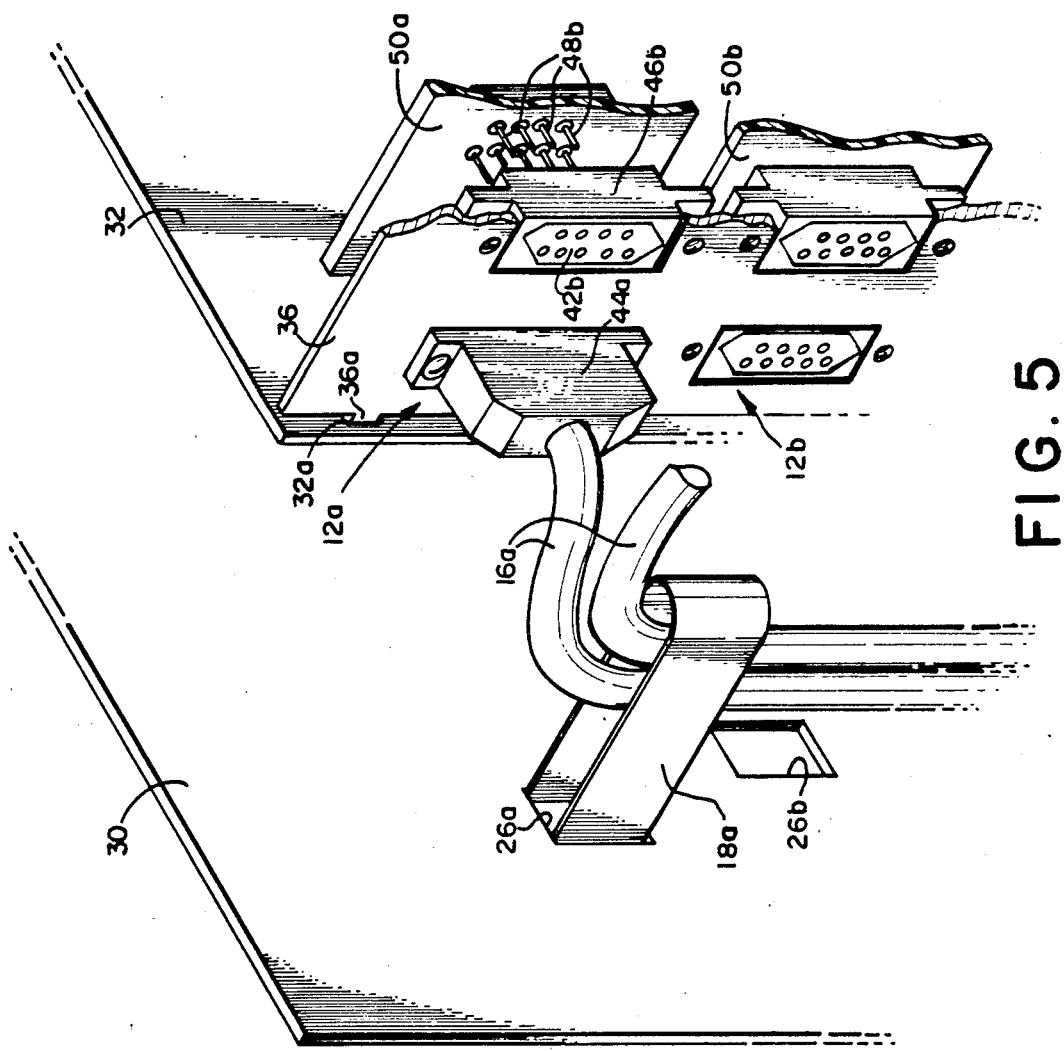

FIG. 3 is a support frame portion in the form of an inside cabinet side wall liner determining the geometry of cable support retainers by the pattern of rectangular openings, FIG. 4 is an enlarged perspective view of a preferred cable retainer; and FIG. 5 is an enlarged perspective view showing somewhat schematically in detail the region of the cable retainer and connection to a printed circuit assembly.

Figure 1:
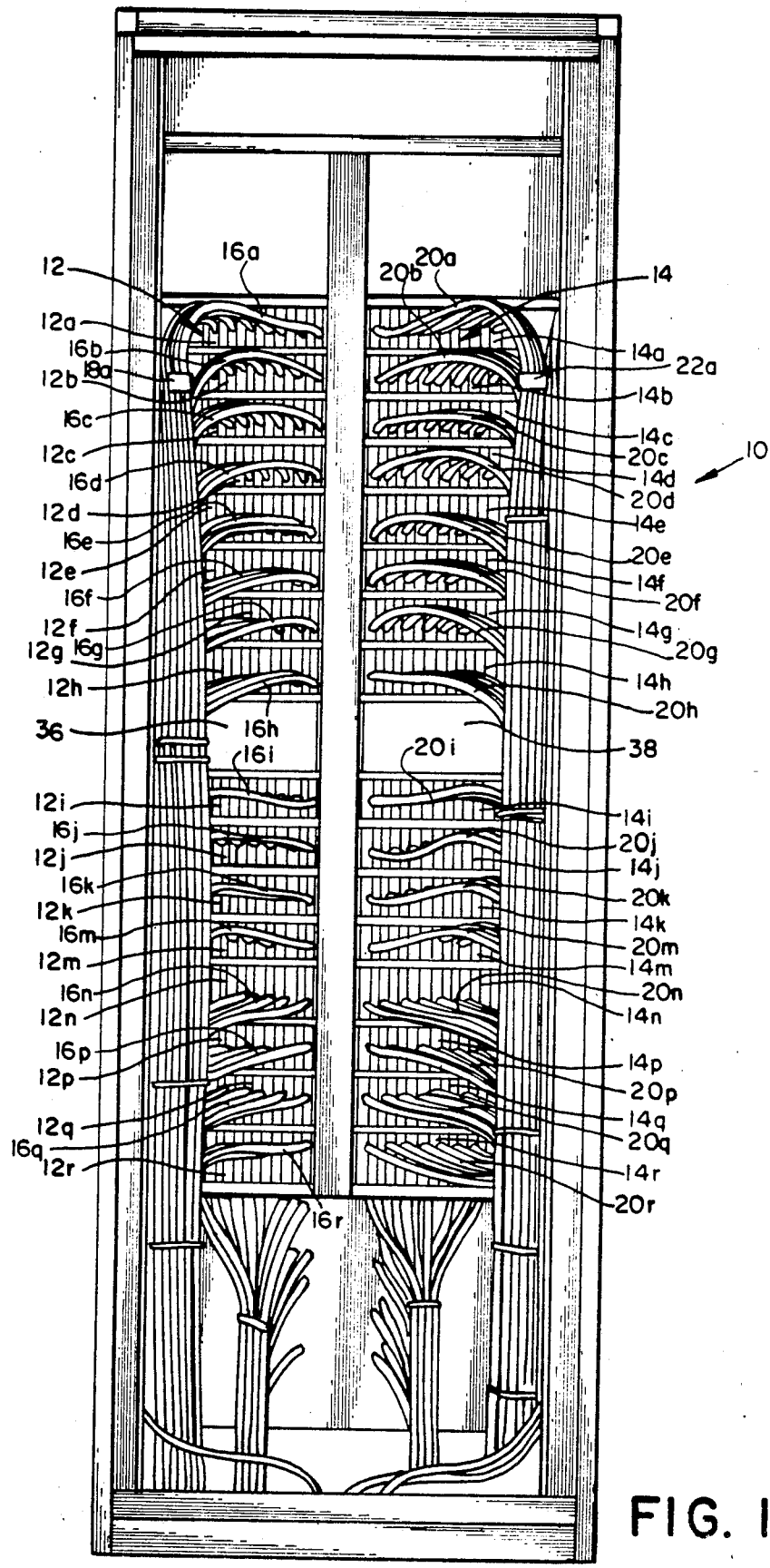
FIG. 1 is an elevational view of a cabinet structure in accordance with the present invention with its back panel removed.
Figure 2:
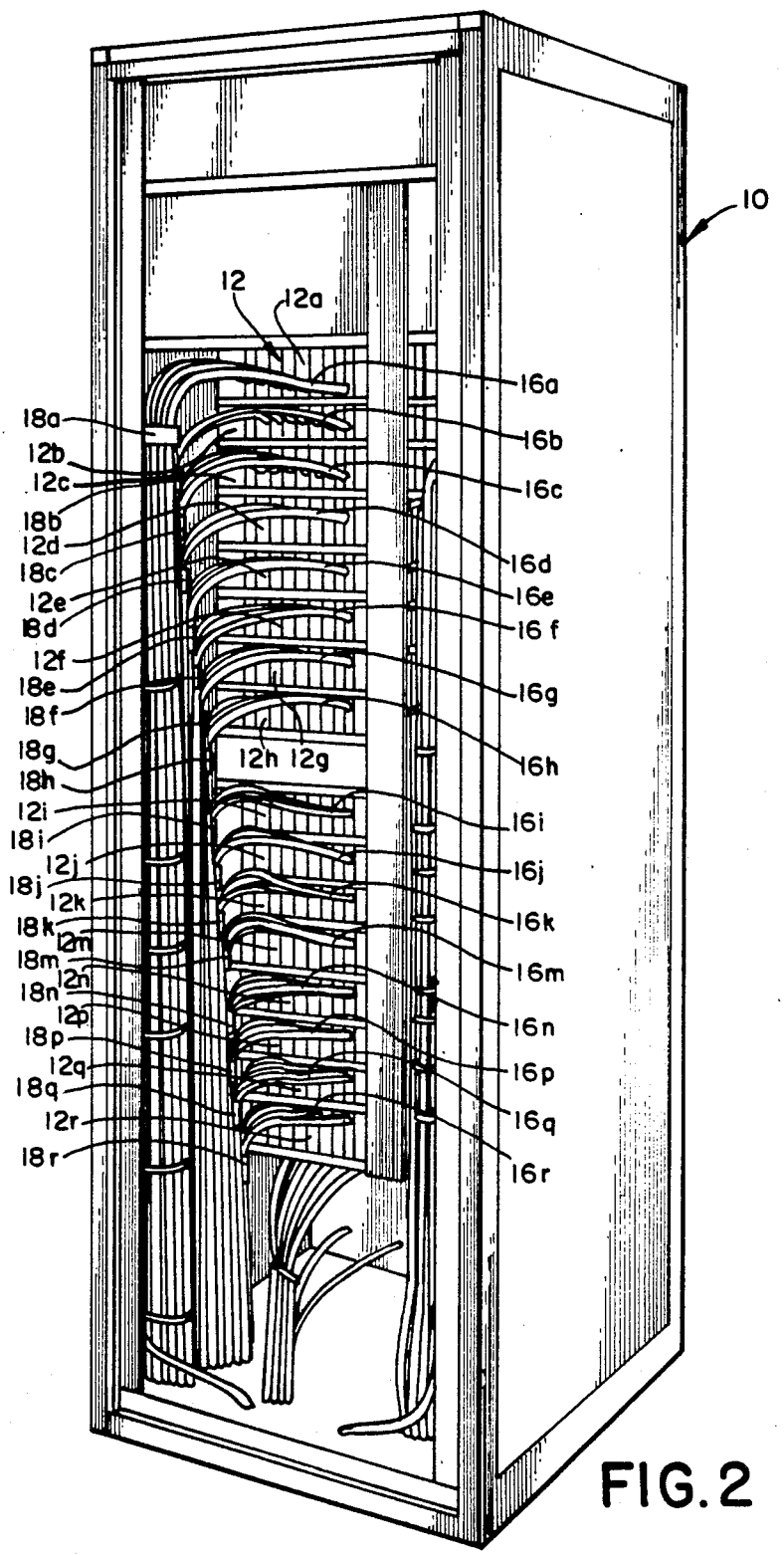
FIG. 2 illustrates the same cabinet in perspective showing the cables for one array of equipment.

Referring first to FIGS. 1 and 2, it will be observed that the structure shown is a cabinet 10 which provides a reference frame for containing as well as supporting electrical equipment in a vertical array. Various types of component equipment may be placed in such an array, for example, switches or switching circuits. The cabinet 10 contains two parallel arrays generally designated 12 and 14, which are generally linear arrays, in this case in a vertical stacked pattern with the cabinet frame providing racks or supports for the component equipments. In this case, there are individually vertically stacked component equipments. In FIGS. 1 and 2 there are two essentially identical vertically stacked arrays which are respectively numbered 12a through 12r and 14a through 14r. Each one of the component equipments, in turn, is made up of a plurality of modules which may, for example, be circuit board supported switch arrays of various combinations, using a single or a plurality of circuit boards. To each of these modules and the terminals thereof is connected an individual cable containing many conductors, perhaps as many as 64 or even 132, or, in many cases, fewer. However, in many cases there is great complexity to the system. In the past, individual wires have been brought to each terminal of the individual modules at random. Even if the wires were combined into cables and brought to the individual modules, the result would be and has still been chaotic, making maintenance and repair of the equipment an extraorindarily difficult job. In accordance with the present invention, however, cable bundle retainers are provided. In this case, where the modules and component equipments are located at the front of the cabinet, the access to those modules is commonly in the back and space has been left in the back for wiring. In accordance with a preferred embodiment of the present invention, as illustrated in FIG. 1, those cables 16a going to the modules in the component equipment 12a are bundled together by a retainer 18a which, in turn, is supported on a portion of the frame, conveniently a plate on the side wall of the cabinet. There can, of course, be multiple retainers subdividing each group, but preferably a single retainer 18 (see FIG. 4) big enough for all of the cables for a particular component equipment is provided. The retainer is supported on the side wall generally at the level of each component equipment. In practice, here as in most equipment, the retainer should normally be supported slightly below the equipment whose cables it supports. The offset permits sufficient room for the cables to be bent from their parallel upward paths by a relatively large arc curve in order to allow them to be connected mechanically to individual component equipment. However, it is desirable particularly in a configuration, which employs an otherwise unsupported vertical run of cable, to place the retainers as high as possible in order to take the gravity load of nearly the full vertical length of the cables, which are ordinarily fed into the cabinet at a low level, often through the floor, but sometimes through a back or side wall of the cabinet. The same kind of retainer is provided for each of the cable bundles 16a through 16r, correspondingly lettered to the equipments 12a through 12r in the array.

In mirror image on the other side of the cabinet, there is a vertical array of component equipments 14. The individual component equipments 14a through 14r are collected in cable bundles 20a through 20r. These bundles are, in turn, supported by retainers 22a through 22r (most of which are not seen) supported on a plate, the opposite wall of the cabinet from retainers 18a through 18r.

Referring to FIGS. 3 and 4 and particularly to FIG. 4, it will be seen that the cable retainer may be advantageously made of a U-shaped piece of spring steel with out-turned flanges. The flanges are a little narrower and a short distance back on the retainer on the order of panel thickness than the width of the strip over most of its length, but preferably the width is just the size of accepting holes 26 or close enough to provide a relatively snug fit. The holes 26, into which the clips are inserted, as seen in FIG. 3, are generally rectangular in shape. The small shoulder 28 is preferably provided by cutting the ends of the strip narrower than the rest of the strip and then folding the flanges outwardly beyond the shoulder before being inserted into a hole 26 as shown in FIG. 5. One flange, preferably away from the mechanic, is first inserted and with the cables in place. The other flange is then inserted by pressing the legs of the retainer together sufficient to allow the flange to enter the hole 26 and once inserted allowing the legs of the retainer to be urged back into position in the panel bearing against the lateral edges of the hole 26. The retainer is best placed so that the shoulder 28 is on the lower side of the clip to help counteract forces which tend to rotate the clip under the weight of the cables. Other embodiments of clips, of course, can have shoulders on both edges so that orientation is not a matter of sensitivity.

As can be seen in FIG. 3, the retainers, and the cable bundles they support, are positioned increasingly further out away from the component equipments as elevation increases.

The preferred method of assembly is first to install the bottom clip 18r in hole 26r. It will be clear that the cable bundle supported by retainer can be most conveniently collected and put in place before the retainer is inserted. Thereafter, the cable connector is connected to its component equipment and preferably separately fixed to a stress relief panel. After cable bundle 16r is in place, retainer 18q is inserted into hole 26q with its cable bundle 12q in place and that cable bundle 12q is connected to its component equipment 14q, or at least the connector on the stress relief plates for that equipment. Next, retainer 18p is put in place in hole 26p with its cable bundle 12p in place and, in turn, is connected to its component equipment 12p. As will be observed, by progressing in this way, the last cable bundle to be put in place is 12a when its retainer 18a is put into hole 26a and the cable then can be connected to its component equipment 18a.

The result of this method and sequence of assembly is that the cable bundles are kept together with related cables going to a particular component equipment. Organization may be further enhanced by tieing the bundles together periodically along their length, preferably without supporting the ties on the walls. While conceivably additional cable bundle retainers could be attached into the walls along the length of the vertical run of the cables, in most instances providing one stable support for the cables to take the gravitational load which otherwise is imposed on the component equipment avoids complication and is sufficient. The positioning of the retainer allows the cables to be gradually curved according to predetermined design and attached individually to connectors as shown in FIG. 5.

It should be observed in passing that the actual cabinet side wall is not the one that is provided with holes but preferably an internal plate liner 30 which fits inside the shell of the cabinet, or frame, is fixed thereto and used to support the cable bundle retainers. Of course, it will be appreciated by those skilled in the art that the cable bundle retainers may be provided in other forms and that the connection to the frame need not be by means of holes, but can be other types of affirmative support. Indeed, the frame need not be a cabinet but, in its simplest form, might simply be an open structural framework or other frame means sufficient to support the component equipment in the required arrays and to support the cable retainers in desired positions relative to their associated component equipments.

Referring now to FIG. 5, an exploded perspective view illustrates just a fragment of a component equipment array. As seen in FIG. 5, one of the many possible cable attachment arrangements is illustrated. In accordance with the invention, a strain relief structure, usually a panel 36, mechanically attached to the system frame or cabinet, provides support for the cable terminator, usually a coupler, immediately adjacent the component equipment. In the embodiment shown, instead of direct attachment to the cabinet, a separate plate 32, which in some embodiments may be part of plate 30, is fixed to the cabinet. The structure is symmetrical with one strain relief structure similar to panel 36 on each side of the cabinet. Each strain relief panel 36 is supported between the wall plate 32 and a center support piece 34, also fixed to the cabinet frame, as seen in FIG. 1. The stress relief panel 36, preferably also extends the length of the vertical arrays 12 and 14. Of course, a similar strain relief panel 38 (FIG. 1) extends the length of the array 14 on the other side of the cabinet. In FIG. 5, strain relief panel 36 is cut away to permit observation of the structure behind the panel that it supports and cooperates with. The strain panel 36 itself is supported on plate 32 in any of a variety of ways, here shown as a tongue and slot configuration, the tongue 36a here being on the panel and the slot 32a on the wall plate 32. Each of the strain relief panels 36, 38 is pierced in the embodiment shown in FIG. 1 by eight aligned horizontal rectangular openings for each array. The top row of openings, of which opening 42b is an example, provides access to the uppermost component equipment behind the panel. Each cable is terminated with a conductor plug or socket, like terminator 44a, in which each of the conductors in the cable is separately connected to a pin which is received in good electrical contact in a correspondingly positioned socket in a mating connector 46b, similar to visible connector 46b already affixed to the panel 36 which mates with the pins of cable connector 44a. When each cable terminator plug, such as plug 44a is plugged into its connector, it may be fastened by jack screws shown to hold it in place, or by other mounting hardware, to panel 36. Such a connection mechanically unites the connector and the panel and transfer weight related stresses to the panel 36. As illustrated by connector 46b, each such connector also receives groups of pins such as the pins 48b on a circuit board for the component equipment 50a, which pins are connected to circuitry thereon. In the embodiment shown, multiple sets of terminals pins for each component equipment, which in this embodiment is a circuit board, are separated from each other running horizontally the length of the circuit board component equipment. What is on the circuit board, or in another component equipment, is not of particular moment in connection with the invention. It may be a switching matrix circuit, for example, or, it may be some other type of device. However, the important thing is that all of its pin connectors 48b are capable of being snugly engaged in the mounting connector 46b and its other pin connector groups engaged in the other seven mounting connectors for the top array 12a. It will be understood from FIGS. 1 and 2 that there are sufficient cables in each bundle and connectors of this sort to reach across the eight connector positions of the component equipment 12a. Because the connectors 44a can be fastened to the strain relieving panel 36, the strain imposed by any residual weight of the cables is imposed on the panel 36 and not on the cable connector pins 48. The panel itself is securely fixed to the cabinet or other frame.

It will be appreciated that each of the succeeding component equipments 12b through 12r down the array are similarly arranged and provided for with connectors. In the embodiment shown in FIG. 5, each component equipment has its own printed circuit board 50b through 50r. In other embodiments, infinite variations and arrangements can be employed.

It will be understood that the present invention also provides a method of utilizing or organizing the cabling for convenient and orderly assembly. That is, for example, considering the array 12, as seen in FIG. 2. The cabling can be brought into the cabinet in successive groups or all brought in simultaneously with the groups to be connected to the different component equipments identified. The cables may be precut to length or they may be cut and provided with cable terminators before or after they have been put in the cabinet. In any event, a method of orderly assembly is provided whereby the cable bundle 16r is first arranged to be connected to the component equipment 12r. The cable bundle 16r is held together by retainer 18r and retainer 18r is inserted into the opening 26r (see FIG. 3) in plate 30. Thereafter, the individual cables with their connector plugs 44 in place may be plugged into their respective sockets and affixed to the strain relief panel 36 by the threaded jack screws, to secure the flanges.

The method then allows the next level of cables 16q to be connected to the component equipment 18q after being first collected together in a bundle by a retainer means 18q which is affixed to the plate 30. The cable connectors for cables 16q are also fixed to the stress relief panel. When the cables are assembled relative to the equipment 12q, the next set of cables 16p is assembled to 12p using retainer 18p. When that is done, the cables 16n are assembled to component equipment 12n using retainer 18n, and so forth, until the last cables 16a are assembled to panel 12a using retainer 18a.

The orderly sequence of cable bundles permit relatively easy removal for maintenance and repair. In some instances, it may be possible to do maintenance and repair without disconnecting the cables and removing the retainers, but, in most instances, it will be necessary to disconnect the cables and remove the retainers of all down to the one requiring attention. The arrangement of the present invention allows ease in disconnection and retainer release so that the cables may be moved away from the work area layer by layer but still retained in their bundles, advantageously with the retainer left on. Then, after maintenance or repair are completed, the retainers may be reattached to the frame plate an the connectors reconnected to the strain panel with relative ease and great savings in time.

It will be clear to those skilled in the art that other types of cable termination may be employed. Preferably, however, in accordance with the invention a cable termination is provided to somehow attach to the frame through the equivalent of the stress relief panel. At the minimum connection to the strain relief is through the connector, and possibly by mechanical attachment means as well. The strain relief panel thus serves to remove from a printed circuit board, or other equipment connection, the load normally imposed by direct connection, in order to reduce the risk of damage, to assure maintenance of better electrical contact, and to minimize the possibility of disconnect.

These and various other possible modifications to the structures shown within the scope of the claims are intended to be within the scope and spirit of the present invention.

I claim:

1. A cable organizing and protection system for use in high conductor density equipment comprising:
   a frame for supporting equipment in at least one multi-level array wherein each component equipment is organized in a generally linear configuration within the array and a plurality of cables are connected into each component equipment, said frame providing entrance for cables and a clear cable path generally parallel to the array; and
   at least one cable bundle retainer for each component equipment supported on the frame generally at the level of each component equipment to which that cable bundle is to be connected, said bundle retainers also being individually in a stepped array progressively outwardly from the component equipment such that the retainer most remote from the cable entrance is further from component equipment to which its supported cables are to be connected.

2. The cable organizing and protecting system of claim 1 in which the at least one multi-level array is vertically arranged.

3. The cable organizing and protecting system of claim 1 in which the cable bundle retainer is made of a generally U-shaped resilient member, the ends of which are provided with means to cooperate with the frame without other fasteners.

4. The cable organizing and protecting system of claim 3 in which the frame provides an enclosing cabinet and a supporting plate for engaging and supporting the retainers.

5. The cable organizing and protecting system of claim 4 in which the cable bundle retainer consists of a strap of generally uniform width of resilient material in generally U-shaped form having generally outwardly extending flanges at the ends thereof and the plate on the frame for supporting the retainers provides openings into which the retainers may be inserted while compressed together such that the natural resilience of the strap urges the flanges apart behind the plate at the edges of the opening to hold the retainer in position.

6. The cable organizing and protecting system of claim 5 in which the strap is provided with a somewhat narrower width at the ends of the strap, before and including the flanges, whereby shoulders are provided on straps on the cable supporting side of the plate and the openings are generally squared and dimensioned to snugly receive the width of the narrower flanged portion of the retainers.

7. A cable organization and protection system in accordance with claim 1 in which the component equipment is supported on the frame relative to a stress relief panel through which connecting means pass from the cable conductors and each cable is provided with termination means enabling it to be mechanically fixed to the stress relief panel to distribute forces imposed on the cable by weight and cable configuration to the panel instead of the component equipments.

8. The cable organization and protection system of claim 7 in which panel means is provided over the length of the array so that cables for a particular component equipment may be distributed in a horizontal distribution just above a bundle retainer for those cables.

9. The cable organization and protection system of claim 8 in which the cable terminator provides conventional connector means for each of the conductors in the cable enabling plug coupling with the component equipment.

10. The cable organization and protection system of claim 7 in which the cable coupling means provides a conductive connection to the stress relief panel which panel is also conductive whereby grounding or shielding for the cable may be connected through the stress relief panel and the frame to ground.

11. The method of assembling cables in a cabinet having component equipments in a vertical array with connections for the various component equipments provided generally horizontally comprising bringing cables for connection to the lowermost component equipment into the cabinet closest to the array, collecting the cables in a cable retainer, and connecting the retainer to the frame at generally the vertical level of the array in position to support the vertical run of cables, positioning the cables for connection to the lowermost equipment, bringing in successive groups of cables to be connected to successive component equipments, collecting cables for each component equipment in a retainer and connecting the successive retainers to the frame further and further from the component equipment as the level of the equipment is successively higher, and positioning the cables for connection to the component equipment before bringing in the cables for the next level.

12. The method of claim 11 including the additional steps of mechanically fixing the cables for each component equipment using terminating connectors to a stress relief panel fixed to the cabinet, and successively fixing each cable group to the stress relief panel for a particular component equipment, before the cables to the higher panel are put in place and connected to their respective stress relief panels, such connections enabling conductors of the cables to be connected respectively to the proper connections of the component equipment.

* * * * *